United States Patent
Thakkar et al.

(10) Patent No.: US 11,237,740 B2
(45) Date of Patent: Feb. 1, 2022

(54) AUTOMATICALLY DETERMINING SIZING CONFIGURATIONS FOR STORAGE COMPONENTS USING MACHINE LEARNING TECHNIQUES

(71) Applicant: EMC IP Holding Company LLC, Hopkinton, MA (US)

(72) Inventors: Bina K. Thakkar, Cary, NC (US); Deepak Gowda, Cary, NC (US); Wenjin Liu, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 231 days.

(21) Appl. No.: 16/778,553

(22) Filed: Jan. 31, 2020

(65) Prior Publication Data

US 2021/0240368 A1 Aug. 5, 2021

(51) Int. Cl.
*G06F 3/06* (2006.01)
*G06K 9/00* (2006.01)
*G06K 9/62* (2006.01)
*G06N 3/04* (2006.01)

(52) U.S. Cl.
CPC .......... *G06F 3/0631* (2013.01); *G06F 3/0611* (2013.01); *G06F 3/0641* (2013.01); *G06F 3/0689* (2013.01); *G06K 9/6276* (2013.01); *G06N 3/04* (2013.01)

(58) Field of Classification Search
CPC .... G06F 3/0631; G06F 3/0611; G06F 3/0641; G06F 3/0689; G06K 9/6276; G06K 9/00771; G06K 9/6272; G06N 3/04
See application file for complete search history.

(56) References Cited

U.S. PATENT DOCUMENTS

| 10,078,594 B2 | 9/2018 | Liu et al. | |
| 2018/0089591 A1* | 3/2018 | Zeiler | G06F 8/31 |
| 2018/0314727 A1 | 11/2018 | Epstein et al. | |
| 2021/0034259 A1* | 2/2021 | Thakkar | G06K 9/6267 |

OTHER PUBLICATIONS

Karen Hao, "What is machine learning?", Nov. 17, 2018, pp. 1-7, https://www.technologyreview.com/2018/11/17/103781/what-is-machine-learning-we-drew-you-another-flowchart/ (Year: 2018).*

* cited by examiner

*Primary Examiner* — Christopher D Birkhimer
(74) *Attorney, Agent, or Firm* — Ryan, Mason & Lewis, LLP

(57) ABSTRACT

Methods, apparatus, and processor-readable storage media for automatically determining sizing configurations for storage components using machine learning techniques are provided herein. An example computer-implemented method includes obtaining multiple items of input related to at least one storage component; determining a set of storage component sizing configurations by processing at least a portion of the multiple items of input using a first set of one or more machine learning techniques comprising at least one deep learning technique; identifying a subset of the storage component sizing configurations by processing at least a portion of the determined set of storage component sizing configurations using a second set of one or more machine learning techniques; and performing one or more automated actions based at least in part on the identified subset of storage component sizing configurations.

20 Claims, 14 Drawing Sheets

*FIG. 6*

```
[ ] import panda as pd
    import tensorflow as tf
    import matplotlib.pyplot as plt
    from sklearn.mixture import GaussianMixture
    from sklearn.decomposition import PCA
    from sklearn.neighbors import KNeighborsClassifier

[ ] # System Configuration Clustering (Gaussian Mixture Model)

[ ] system_configuration = pd.read_csv('system_configuration.csv')
    system_configuration['Model'] = system_configuration['Model'].map({'350F' : 1})
    system_configuration['Flash'] = system_configuration['Flash'].map({'Yes' : 1, 'No' : 0})
    system_configuration['Data Reduction'] = system_configuration['Data Reduction'].map({'Yes' : 1, 'No' : 0})
    system_configuration['Advanced Deduplication'] = system_configuration['Advanced Deduplication'].map({'Yes' : 1, 'No' : 0})
    system_configuration
```

```
cluster_model = GaussianMixture(n_components=3)
cluster_model.fit(system_configuration)
cluster = cluster_model.predict(system_configuration)
pca_transform = PCA(n_components=2).fit_transform(system_configuration)
cluster_color = [[('red' if x == 0 else ('green' if x == 1 else 'blue')) for x in clusters]
plt.scatter(pca_transform[:, 0], pca_transform[:, 1], color=cluster_color)
plt.xlabel('Principal Component 1')
plt.ylabel('Principal Component 2')
plt.title('System Configuration Clustering')
plt.show()
```

FIG. 8

```
[ ]  # Dynamic Tracking, Intelligent Analysis of Iops...

[ ]  iops = pd.read_csv('iops.csv')
     alpha = 0.4
     cluster_0 = iops[iops['Cluster'] == 'Cluster_1']
     cluster_1 = iops[iops['Cluster'] == 'Cluster_2']
     cluster_2 = iops[iops['Cluster'] == 'Cluster_3']
     plt.boxplot([cluster_0['Iops'], cluster_1['Iops'], cluster_2['Iops']])
     x = pd.np.random.normal(1, 0.08, size=cluster_0.shape[0])
     plt.scatter(x, cluster_0['Iops'], marker='.', c='red', s=0.01, alpha=alpha)
     x = pd.np.random.normal(2, 0.08, size=cluster_1.shape[0])
     plt.scatter(x, cluster_1['Iops'], marker='.', c='blue', s=0.01, alpha=alpha)
     x = pd.np.random.normal(3, 0.08, size=cluster_2.shape[0])
     plt.scatter(x, cluster_2['Iops'], marker='.', c='green', s=0.01, alpha=alpha)
     plt.title('Iops')
     plt.xlabel('Cluster')
     plt.show()
```

*FIG. 9*

```
Deep Learning (Neural Network) From Big Data With High Accuracy cluster_1 = ["Conf1", "Conf2", "Conf3", "Conf5", "Conf7", "Conf9", "Conf10", "Conf12", "Conf13", "Conf14", "Conf16", "Conf18",
cluster_2 = ["Conf11", "Conf15", "Conf17"]
cluster_3 = ["Conf4", "Conf6", "Conf8"]
iops1 = pd.read_csv('iops_1.csv')
nn_input = pd.merge(left=iops1, right=system_configuration, on='Configuration')
columns = ['Iops', 'Reads', 'Writes', 'Cluster', 'Data Reduction', 'Advance Deduplication', 'Data Reduction Ratio', 'RAID 5',
nn_input = nn_input[columns]
nn_input.loc[nn_input['RAID 5'] > 0,| 'RAID 5'] = 1
nn_input.loc[nn_input['RAID 6'] > 0, 'RAID 6'] = 1
nn_input.loc[nn_input['RAID 1/0'] > 0, 'RAID 1/0'] = 1
nn_input.to_csv('nn_input.csv', index=False)
nn_input
```

*FIG. 10*

```
[ ]  data = nn_input.drop(['Cluster'], axis=1)
     input_dim = data.shape[1]
     labels = nn_input['Cluster']
     labels = labels.map({'Cluster_1' : 0, 'Cluster_2' : 1, 'Cluster_3' : 2})
     labels = [[int(x)] for x in labels]
     labels = tf.keras.utils.to_categorical(y, num_classes=3)

nn_model = tf.keras.models.Sequential()
     nn_model.add(tf.keras.layers.Dense(64, input_dim=input_dim))
     nn_model.add(tf.keras.layers.Activation('relu'))
     nn_model.add(tf.keras.layers.Dense(16))
     nn_model.add(tf.keras.layers.Activation('relu'))
     nn_model.add(tf.keras.layers.Dense(3))
     nn_model.add(tf.keras.layers.Activation('softmax'))

nn_model.compile(optimizer='rmsprop', loss='categorical_crossentropy', metrics=['accuracy'])

[ ]  nn_model.fit(data.values, labels, epochs=10, batch_size=32)
```

```
Intelligent Configuration Cluster Selection by Applying The Trained Deep Learning Model example_customer_input = {'Iops' : 800,
                          'Reads' : 60,
                          'Writes' : 40,
                          'Data Reduction' : 0,
                          'Advanced Deduplication' : 0,
                          'Data Reduction Ratio' : 1,
                          'RAID 5' : 1,
                          'RAID 6' : 0,
                          'RAID 1/0' : 0,
                          'Unconfigured Drive' : 0,
                          'pool count' : 1}
customer_input = pd.np.array([[800, 60, 40, 0, 0, 1, 1, 0, 0, 0, 1]])
predict_cluster = nn_model.predict(customer_input)
predict_cluster = pd.np.argmax(predict_cluster) + 1
print('Deep Learning Model Output Cluster: {}' .format(predict_cluster))

Deep Learning Model Output Cluster: 1
```

FIG. 12

```
cluster_color = [('red' if x == 0 else ('grey' if x == 1 else 'grey')) for x in clusters]
plt.scatter(pca_transform[:, 0], pca_transform[:, 1], color=cluster_color)
plt.xlabel('Principal Component 1')
plt.ylabel('Principal Component 2')
plt.title('Deep Learning Model Selects Cluster: 1')
plt.show()
```

```
# Use KNN Machine Learning Algorithm to Select Top 3 Configurations Within the Cluster

[ ]   columns = ['Iops', 'Reads', 'Writes', 'Data Reduction', 'Advanced Deduplication', 'Data Reduction Ratio',
                 'RAID 5', 'RAID 6', 'RAID 1/0', 'Unconfigured Drive', 'pool count']
      iops1 = pd.read_csv('iops_1.csv')
      knn_input = pd.merge(left=iops1, right=system_configuration, on='Configuration')
      knn_input = knn_input[columns + ['Configuration', 'Cluster']]
      knn_input = knn_input[knn_input['Cluster'] == 'Cluster_1']
      data = knn_input[columns]
      labels = knn_input['Configuration']
      knn_model = KNeighborsClassifier(n_neighbors=3)
      knn_model.fit(data, labels)

●    KNeighborsClassifier(algorithm='auto', leaf_size=30, metric='minkowski',
                           metric_params=None, n_jobs=None, n_neighbors=3, p=2,
                           weights='uniform')

[ ]   neighbors = knn_model.kneighbors(customer_input)[1][0]
      predict_confs = labels.loc[neighbors].tolist()
      print('KNN Machine Learning Model Selects Configuration: {}' .format(predict_confs))

●    KNN Machine Learning Model Selects Configuration: ['Conf2', 'Conf18', 'Conf7']

[ ]   cluster_color = [('red' if x in predict_confs else 'grey') for x in system_configuration['Configuration']]
      plt.scatter(pca_transform[:, 0], pca_transform[:, 1], color=cluster_color)
      plt.xlabel('Principal Component 1')
      plt.ylabel('Principal Component 2')
      plt.title("KNN Configuration Selection:\n{}" .format(predict_confs))
      plt.show()
```

AUTOMATICALLY DETERMINING SIZING CONFIGURATIONS FOR STORAGE COMPONENTS USING MACHINE LEARNING TECHNIQUES

FIELD

The field relates generally to information processing systems, and more particularly to techniques for managing storage components using such systems.

BACKGROUND

Sizing storage components typically involves generating one or more storage configurations to meet a user's needs. Conventional sizing approaches commonly require manual human involvement from individuals with particular knowledge pertaining to various storage components and workloads, as well as tradeoffs between different configuration dimensions. However, such conventional approaches often result in inaccurate sizing determinations, leading to drawbacks such as increased support costs, decreased user satisfaction, etc.

SUMMARY

Illustrative embodiments of the disclosure provide techniques for automatically determining sizing configurations for storage components using machine learning techniques. An exemplary computer-implemented method includes obtaining multiple items of input related to at least one storage component, and determining a set of storage component sizing configurations by processing at least a portion of the multiple items of input using a first set of one or more machine learning techniques comprising at least one deep learning technique. The method also includes identifying a subset of the storage component sizing configurations by processing at least a portion of the determined set of storage component sizing configurations using a second set of one or more machine learning techniques. Further, the method includes performing one or more automated actions based at least in part on the identified subset of storage component sizing configurations.

Illustrative embodiments can provide significant advantages relative to conventional sizing approaches. For example, problems associated with inaccurate sizing determinations are avoided in one or more embodiments through the implementation of machine learning techniques in connection with dynamically obtained storage system data.

These and other illustrative embodiments described herein include, without limitation, methods, apparatus, systems, and computer program products comprising processor-readable storage media.

BRIEF DESCRIPTION OF THE DRAWINGS

FIG. 6 shows an example code snippet for implementing at least a portion of a machine learning-based workload analyzer in an illustrative embodiment.

FIG. 7 shows an example code snippet for implementing at least a portion of a machine learning-based workload analyzer in an illustrative embodiment.

FIG. 8 shows an example code snippet for implementing at least a portion of a machine learning-based workload analyzer in an illustrative embodiment.

FIG. 9 shows an example code snippet for implementing at least a portion of a machine learning-based workload analyzer in an illustrative embodiment.

FIG. 10 shows an example code snippet for implementing at least a portion of a machine learning-based workload analyzer in an illustrative embodiment.

FIG. 11 shows an example code snippet for implementing at least a portion of a machine learning-based workload analyzer in an illustrative embodiment.

FIG. 12 shows an example code snippet for implementing at least a portion of a machine learning-based workload analyzer in an illustrative embodiment.

FIG. 13 shows an example code snippet for implementing at least a portion of a machine learning-based workload analyzer in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
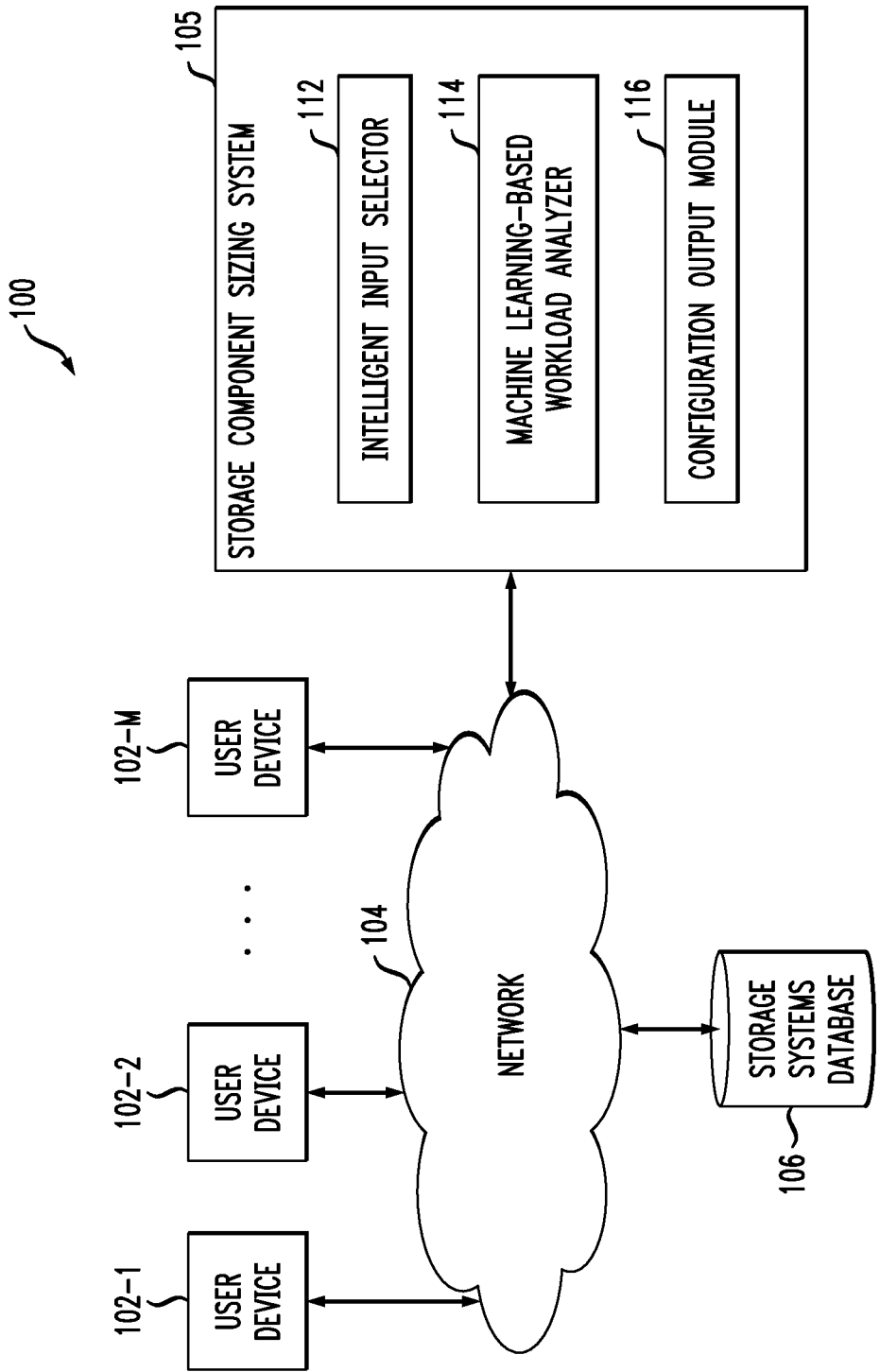
FIG. 1 shows an information processing system configured for automatically determining sizing configurations for storage components using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage component sizing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the storage component sizing system 105 can have an associated storage systems database 106 configured to store data pertaining to storage device performance and configuration data, which comprise, for example, input/output operations per second (IOPS), storage component capacity, storage component workload information, data reduction information, deduplication information, block size information, drive type information, redundant array of independent disks (RAID) group information. These and other references to "disks" herein are intended to refer generally to storage devices, including solid state drives (SSDs), and should therefore not be viewed as limited in any way to spinning magnetic media.

The storage systems database 106 in the present embodiment is implemented using one or more storage systems associated with storage component sizing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the storage component sizing system 105 can be input-output devices, which illustratively comprise keyboards, displays or other types of input-output devices in any combination. Such input-output devices can be used, for example, to support one or more user interfaces to storage component sizing system 105, as well as to support communication between the storage component sizing system 105 and other related systems and devices not explicitly shown.

The storage component sizing system 105 in the FIG. 1 embodiment is assumed to be implemented using at least one processing device. Each such processing device generally comprises at least one processor and an associated memory, and implements one or more functional modules for controlling certain features of the storage component sizing system 105.

More particularly, the storage component sizing system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the storage component sizing system 105 to communicate over the network 104 with the user devices 102, and illustratively comprises one or more conventional transceivers.

The storage component sizing system 105 further comprises an intelligent input selector 112, a machine learning-based workload analyzer 114, and a configuration output module 116.

It is to be appreciated that this particular arrangement of modules 112, 114, and 116 illustrated in the storage component sizing system 105 of the FIG. 1 embodiment is presented by way of example only, and alternative arrangements can be used in other embodiments. For example, the functionality associated with the modules 112, 114, and 116 in other embodiments can be combined into a single module, or separated across a larger number of modules. As another example, multiple distinct processors can be used to implement different ones of the modules 112, 114, and 116 or portions thereof.

At least portions of modules 112, 114, and 116 may be implemented at least in part in the form of software that is stored in memory and executed by a processor.

It is to be understood that the particular set of elements shown in FIG. 1 for automatically determining sizing configurations for storage components using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114, and 116 of an example storage component sizing system 105 in computer network 100 will be described in more detail with reference to the flow diagram of FIG. 14.

Additionally or alternatively, in one or more embodiments, the storage component sizing system 105 can include at least one rules engine, a machine learning-based capacity analyzer, and/or a priority engine. Such a rules engine can implement rules pertaining to parameters such as pool count(s), unconfigured and/or spare drive(s), tier allocation(s), RAID group(s), etc. A machine learning-based capacity analyzer can be configured to process information related to unconfigured and/or hot spares, snapshots, overhead and/or metadata, system drives, etc. Further, a priority engine can be configured to prioritize certain devices and/or variables, such as, for example, prioritizing newer models over older models, etc.

Accordingly, and as further detailed herein, at least one embodiment includes automatically sizing storage components using machine learning techniques. Such an embodiment can be utilized for sizing new storage devices and/or systems as well as sizing existing storage devices and/or systems. At least one embodiment includes leveraging data processed by one or more storage monitoring systems, as well as real-time storage device information. Also, in addition to storage devices, it is to be appreciated that one or more embodiments can be implemented in connection with processing devices such as servers, computers and/or laptops, to recommend correct model, disk, etc. configuration parameters based on user usage data.

As noted in connection with FIG. 1, at least one embodiment includes utilizing an intelligent input selector (e.g., module 112 in FIG. 1), which can remove the guess work on the user's behalf by determining and/or generating input suggestions by querying storage monitoring data sources, and applying statistical analysis and/or machine learning techniques to the obtained data.

Figure 2:
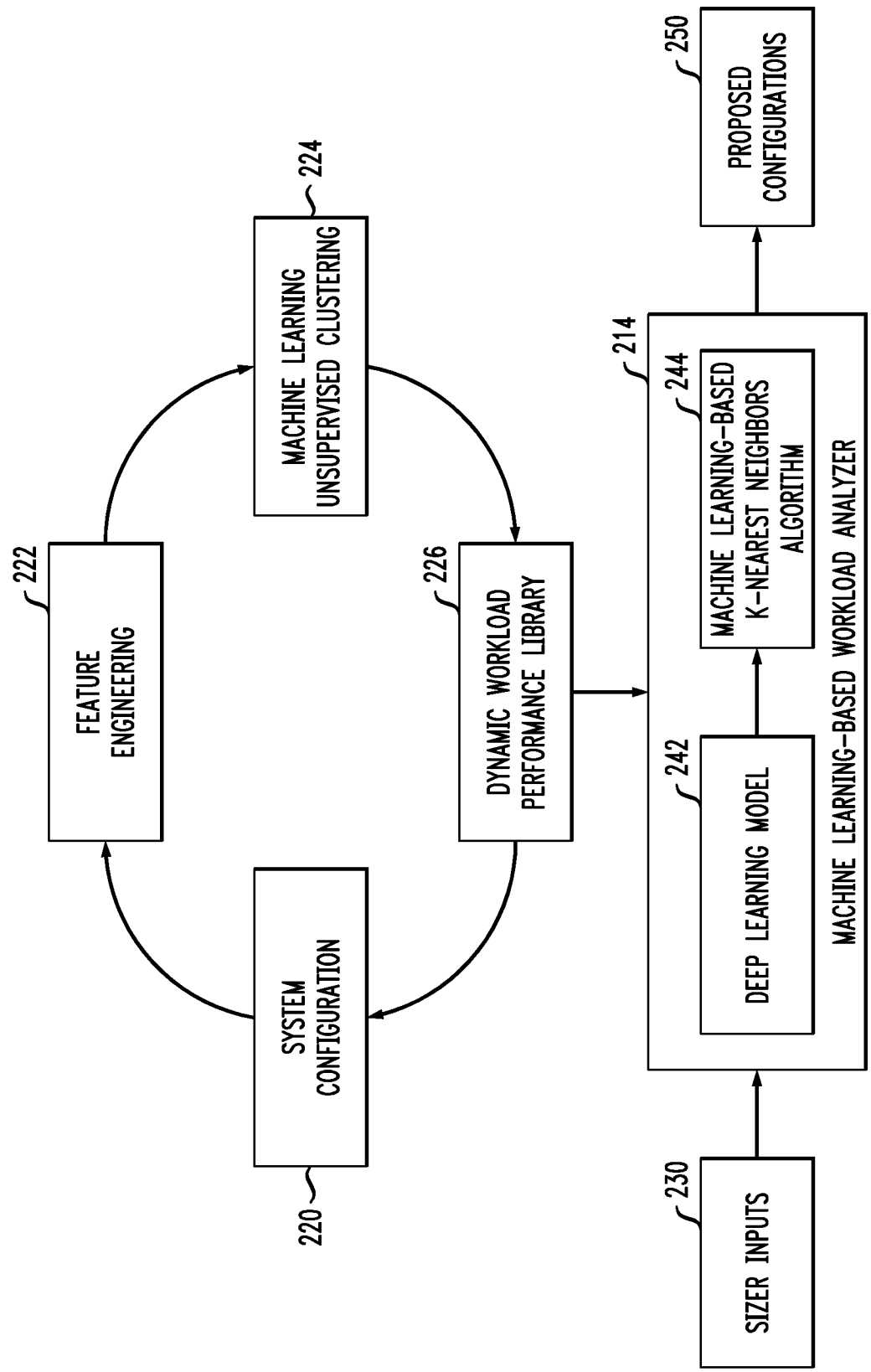
FIG. 2 shows an example workflow involving a machine learning-based workload analyzer in an illustrative embodiment.

FIG. 2 shows an example workflow involving a machine learning-based workload analyzer 214 in an illustrative embodiment. By way of illustration, FIG. 2 depicts the creation of a dynamic workload performance library 226 based on inputs pertaining to system configuration information 220, feature engineering 222 (e.g., model type information, flash information, data reduction information, advanced reduction information, etc.), and machine learning unsupervised clustering technique outputs 224. In an example embodiment, the dynamic workload performance library 226 can be updated daily based on peer learning in connection with the above-noted input sources (with data derived from other storage devices and/or systems). Based at least in part on the generated and/or updated dynamic workload performance library 226, a deep learning model 242 within the machine learning-based workload analyzer 214 can be created and/or updated to determine configuration clusters using user-provided sizer inputs 230.

Figure 3:
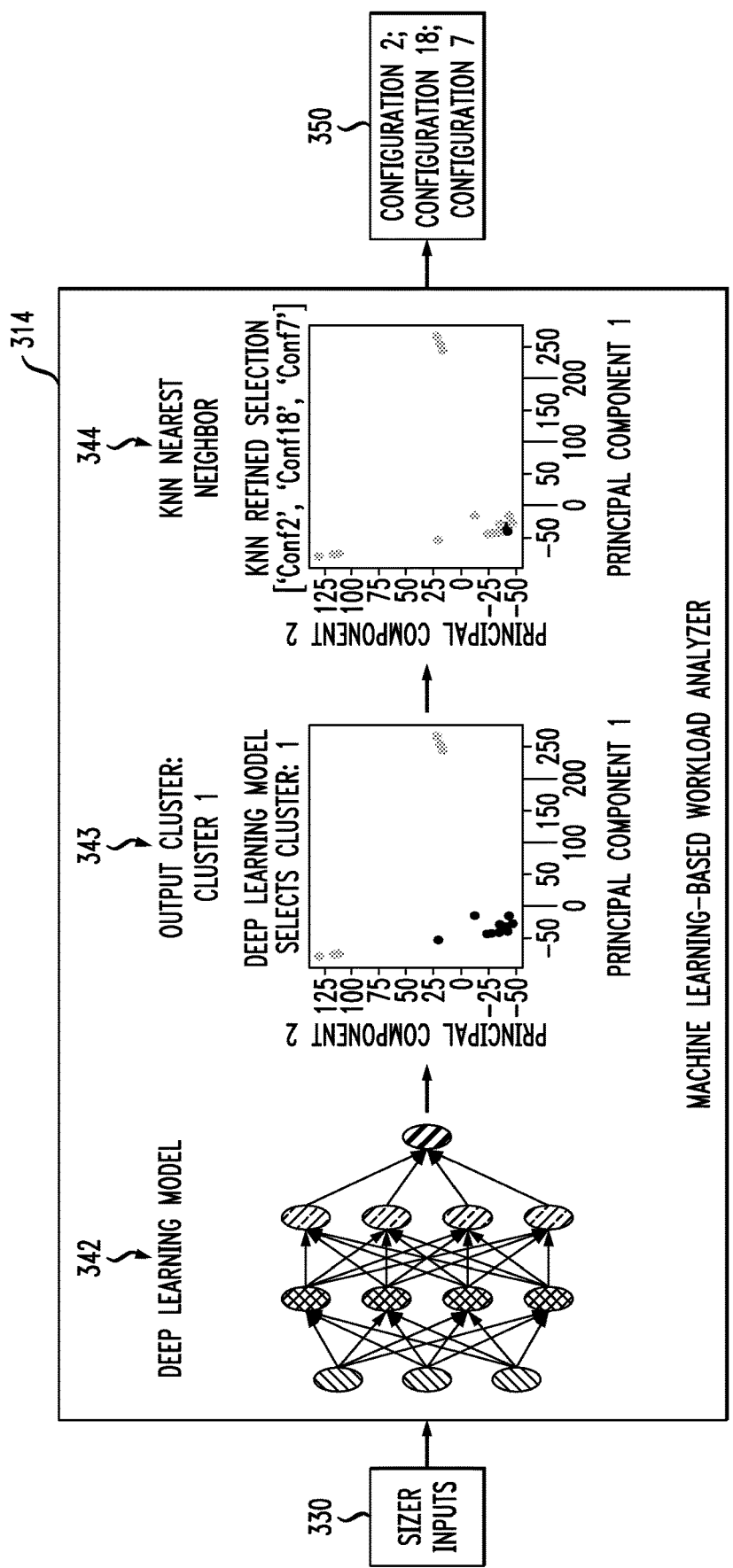
FIG. 3 shows an example workflow involving a machine learning-based workload analyzer in an illustrative embodiment.

In an example embodiment, the user-provided sizer inputs 230 can include IOPS information, capacity information, workload information, data reduction information, advanced deduplication information, RAID group information, etc. Accordingly, the deep learning model 242 can, based on such inputs 230, determine group configurations with similar workload capability using an unsupervised clustering and Gaussian mixture model. By way of example, such a determination can include dynamic tracking and intelligent analysis of IOPS information performed by a neural network (such as depicted in FIG. 3, for example) and/or multilayer perceptron (MLP). The determination(s) generated by the deep learning model 242 are then processed by machine learning-based k-nearest neighbors (KNN) algorithm 244, which generates an output of proposed configurations 250, as further described herein.

FIG. 3 shows an example workflow involving a machine learning-based workload analyzer in an illustrative embodiment. By way of illustration, FIG. 3 depicts machine learning-based workload analyzer 314 processing sizer inputs 330 (pertaining to a given user device) to generate configuration options 350 from which a user can choose for implementation. The machine learning-based workload analyzer 314 first passes the sizer inputs 330 through a deep learning model (e.g., a neural network) 342 to generate an output cluster 343 of configurations associated with other devices. The output cluster 343 is then processed by a KNN algorithm 344, which determines a subset of the configurations from output cluster 343 to output to the user as options 350.

Figure 4:
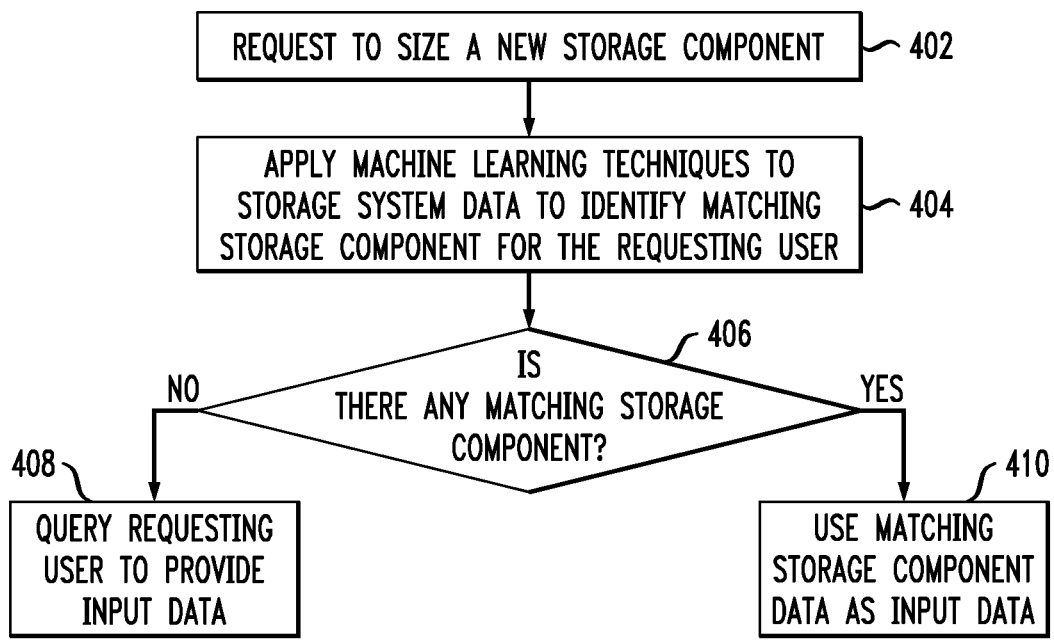
FIG. 4 shows an example workflow involving an intelligent input selector in an illustrative embodiment.

FIG. 4 shows an example workflow involving an intelligent input selector in an illustrative embodiment. Step 402 includes requesting to size a new storage component, and step 404 includes applying one or more machine learning techniques to storage system input data to identify at least one matching storage component (from a collection of other storage systems, devices, and/or components) for the requesting user. Such input data can include, for example, information pertaining to capacity, IOPS, data reduction, RAID group type, workload(s), block size, drive type, etc. As also depicted in FIG. 4, step 406 includes determining whether there are any matching storage components. If no (that is, there are no matching storage components), then the workflow continues to step 408, which includes querying the requesting user to provide additional input data. If yes (that is, there is at least one matching storage component), then the workflow continues to step 410, which includes using the matching storage component data as input data for a sizing determination.

Figure 5:
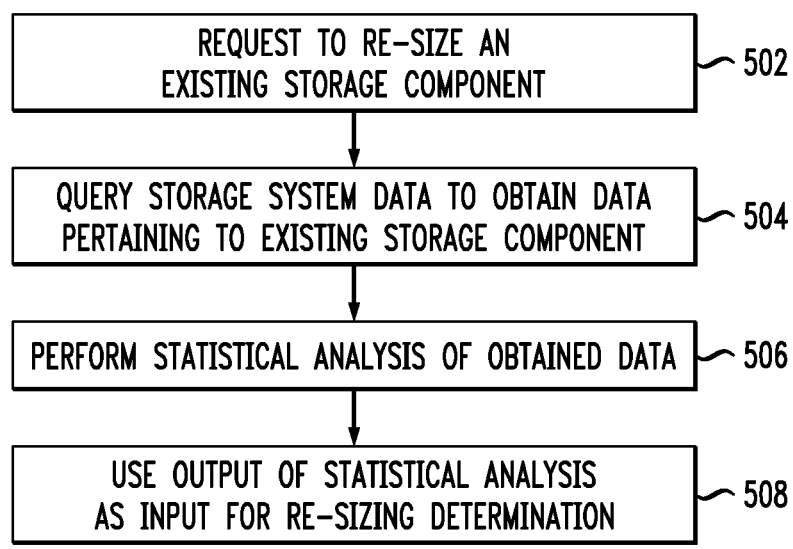
FIG. 5 shows an example workflow involving an intelligent input selector in an illustrative embodiment.

FIG. 5 shows an example workflow involving an intelligent input selector in an illustrative embodiment. Step 502 includes requesting to re-size an existing storage component, and step 504 includes querying the requesting user and/or corresponding storage system to obtain data pertaining to the existing storage component (which can include, for example, information pertaining to usable and effective capacity, IOPS, data reduction, RAID group type(s), drive type(s), etc.). Additionally, step 506 includes performing statistical analysis on the obtained data, and step 508 includes using the output of the statistical analysis as input for a re-sizing determination. By way merely of example, the statistical analysis performed in step 506 can include analyzing capacity growth, analyzing IOPS rate(s), analyzing workload information (e.g., read/write information), analyzing block size(s), etc.

As further detailed below, FIG. 6 through FIG. 13 illustrate portions of example code snippets pertaining to implementing an example machine learning-based workload analyzer in one or more embodiments.

FIG. 6 shows an example code snippet for implementing at least a portion of a machine learning-based workload analyzer in an illustrative embodiment. In this embodiment, example code snippet 600 is executed by or under the control of at least one processing system and/or device. For example, the example code snippet 600 may be viewed as comprising a portion of a software implementation of at least part of storage component sizing system 105 of the FIG. 1 embodiment.

The example code snippet 600 illustrates importing and/or obtaining a machine learning algorithm (e.g., using TensorFlow) with a Gaussian mixture, along with system configurations pertaining to multiple parameters. It is to be appreciated that this particular example code snippet shows just one example implementation of a portion of a machine learning-based workload analyzer, and alternative implementations of the process can be used in other embodiments.

FIG. 7 shows an example code snippet for implementing at least a portion of a machine learning-based workload analyzer in an illustrative embodiment. In this embodiment, example code snippet 700 is executed by or under the control of at least one processing system and/or device. For example, the example code snippet 700 may be viewed as comprising a portion of a software implementation of at least part of storage component sizing system 105 of the FIG. 1 embodiment.

The example code snippet 700 illustrates utilizing the machine learning algorithm with Gaussian mixture model to cluster the system configurations in accordance with multiple parameters. It is to be appreciated that this particular example code snippet shows just one example implementation of a portion of a machine learning-based workload analyzer, and alternative implementations of the process can be used in other embodiments.

FIG. 8 shows an example code snippet for implementing at least a portion of a machine learning-based workload analyzer in an illustrative embodiment. In this embodiment, example code snippet 800 is executed by or under the control of at least one processing system and/or device. For example, the example code snippet 800 may be viewed as comprising a portion of a software implementation of at least part of storage component sizing system 105 of the FIG. 1 embodiment.

The example code snippet 800 illustrates performing dynamic tracking and/or intelligent analysis of IOPS information with respect to the clusters determined and/or output by the machine learning algorithm with Gaussian mixture model. It is to be appreciated that this particular example code snippet shows just one example implementation of a portion of a machine learning-based workload analyzer, and alternative implementations of the process can be used in other embodiments.

FIG. 9 shows an example code snippet for implementing at least a portion of a machine learning-based workload analyzer in an illustrative embodiment. In this embodiment, example code snippet 900 is executed by or under the control of at least one processing system and/or device. For example, the example code snippet 900 may be viewed as comprising a portion of a software implementation of at least part of storage component sizing system 105 of the FIG. 1 embodiment.

The example code snippet 900 illustrates initiating a deep learning technique (e.g., a neural network) in connection with the clusters determined and/or output by the machine learning algorithm with Gaussian mixture model. It is to be appreciated that this particular example code snippet shows just one example implementation of a portion of a machine learning-based workload analyzer, and alternative implementations of the process can be used in other embodiments.

FIG. 10 shows an example code snippet for implementing at least a portion of a machine learning-based workload analyzer in an illustrative embodiment. In this embodiment, example code snippet 1000 is executed by or under the control of at least one processing system and/or device. For example, the example code snippet 1000 may be viewed as comprising a portion of a software implementation of at least part of storage component sizing system 105 of the FIG. 1 embodiment.

The example code snippet 1000 illustrates configuring the deep learning technique (e.g., neural network) in connection with the clusters determined and/or output by the machine learning algorithm with Gaussian mixture model. It is to be appreciated that this particular example code snippet shows just one example implementation of a portion of a machine learning-based workload analyzer, and alternative implementations of the process can be used in other embodiments.

FIG. 11 shows an example code snippet for implementing at least a portion of a machine learning-based workload analyzer in an illustrative embodiment. In this embodiment, example code snippet 1100 is executed by or under the control of at least one processing system and/or device. For example, the example code snippet 1100 may be viewed as comprising a portion of a software implementation of at least part of storage component sizing system 105 of the FIG. 1 embodiment.

The example code snippet 1100 illustrates identifying and/or selecting a subset of the clusters (e.g., one of the clusters) determined and/or output by the machine learning algorithm with Gaussian mixture model by applying the deep learning technique (e.g., neural network) to the cluster information. It is to be appreciated that this particular example code snippet shows just one example implementation of a portion of a machine learning-based workload analyzer, and alternative implementations of the process can be used in other embodiments.

FIG. 12 shows an example code snippet for implementing at least a portion of a machine learning-based workload analyzer in an illustrative embodiment. In this embodiment, example code snippet 1200 is executed by or under the control of at least one processing system and/or device. For example, the example code snippet 1200 may be viewed as comprising a portion of a software implementation of at least part of storage component sizing system 105 of the FIG. 1 embodiment.

The example code snippet 1200 illustrates visualization of the identification and/or selection of the subset of the clusters (e.g., one of the clusters) determined and/or output by the machine learning algorithm with Gaussian mixture model. It is to be appreciated that this particular example code snippet shows just one example implementation of a portion of a machine learning-based workload analyzer, and alternative implementations of the process can be used in other embodiments.

FIG. 13 shows an example code snippet for implementing at least a portion of a machine learning-based workload analyzer in an illustrative embodiment. In this embodiment, example code snippet 1300 is executed by or under the control of at least one processing system and/or device. For example, the example code snippet 1300 may be viewed as comprising a portion of a software implementation of at least part of storage component sizing system 105 of the FIG. 1 embodiment.

The example code snippet 1300 illustrates using a KNN machine learning algorithm to select a given number (e.g., the top three) of the configurations contained within the subset of clusters identified via the application of the deep learning technique (e.g., neural network).

It is to be appreciated that this particular example code snippet shows just one example implementation of a portion of a machine learning-based workload analyzer, and alternative implementations of the process can be used in other embodiments.

Figure 14:
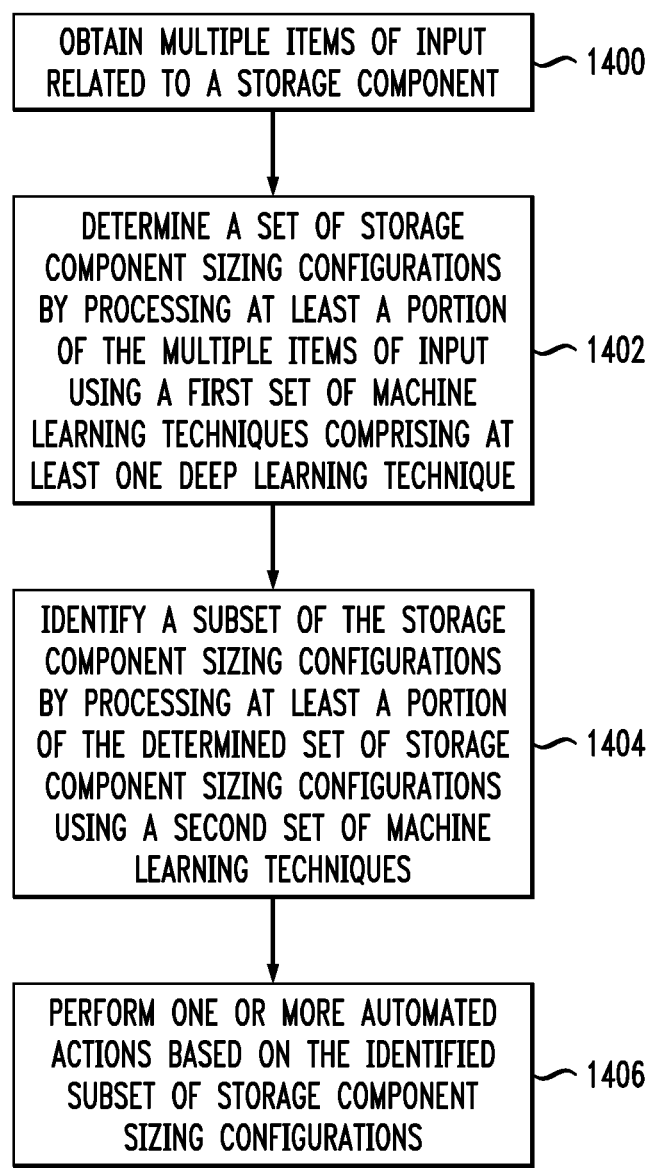
FIG. 14 is a flow diagram of a process for automatically determining sizing configurations for storage components using machine learning techniques in an illustrative embodiment.

FIG. 14 is a flow diagram of a process for automatically sizing storage components using machine learning techniques in an illustrative embodiment. It is to be understood that this particular process is only an example, and additional or alternative processes can be carried out in other embodiments.

In this embodiment, the process includes steps 1400 through 1406. These steps are assumed to be performed by the storage component sizing system 105 utilizing its modules 112, 114 and 116.

Step 1400 includes obtaining multiple items of input related to at least one storage component. The multiple items of inputs can include information pertaining to two or more of input/output operations per second (IOPS), storage component capacity, at least one storage component workload, data reduction, deduplication, block size, drive type, and at least one redundant array of independent disks (RAID) group. In one or more embodiments, obtaining the multiple items of input includes querying a storage systems database for data and applying at least one statistical analysis technique to the queried data.

Step 1402 includes determining a set of storage component sizing configurations by processing at least a portion of the multiple items of input using a first set of one or more machine learning techniques comprising at least one deep learning technique. The at least one deep learning technique can include at least one neural network and/or at least one multilayer perceptron.

Step 1404 includes identifying a subset of the storage component sizing configurations by processing at least a portion of the determined set of storage component sizing configurations using a second set of one or more machine learning techniques. In one or more embodiments, the first set and second set of one or more machine learning techniques can include the same machine learning technique(s) or one or more different machine learning techniques. Additionally or alternatively, in one or more embodiments, the one or more machine learning techniques include at least one machine learning-based k-nearest neighbors algorithm.

Step 1406 includes performing one or more automated actions based at least in part on the identified subset of storage component sizing configurations. In at least one embodiment, performing the one or more automated actions includes outputting the identified subset of storage component sizing configurations to a user for selection of at least one of the storage component sizing configurations from the subset.

The techniques depicted in FIG. 14 can also include generating a dynamic workload performance library by applying at least one machine learning-based unsupervised clustering model to data pertaining to multiple storage components. In such an embodiment, the at least one machine learning-based unsupervised clustering model can include at least one machine learning-based unsupervised clustering with Gaussian mixture model, and the data pertaining to multiple storage components can include configuration data and feature engineering data. Further, such an embodiment can also include updating the at least one deep learning technique using the generated dynamic workload performance library.

Accordingly, the particular processing operations and other functionality described in conjunction with the flow diagram of FIG. 14 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement machine learning techniques in connection with dynamically obtained storage system data. These and other embodiments can effectively preclude inaccurate sizing determinations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. Although described in the context of system 100, these platforms may also be used to implement at least portions of other information processing systems in other embodiments.

Figure 15:
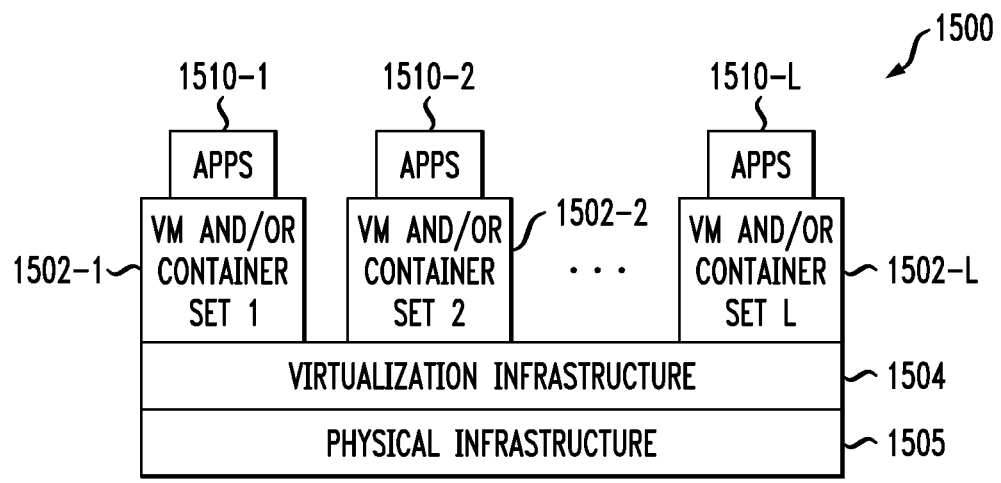
FIGS. 15 and 16 show examples of processing platforms that may be utilized to implement at least a portion of an information processing system in illustrative embodiments.
Figure 16:
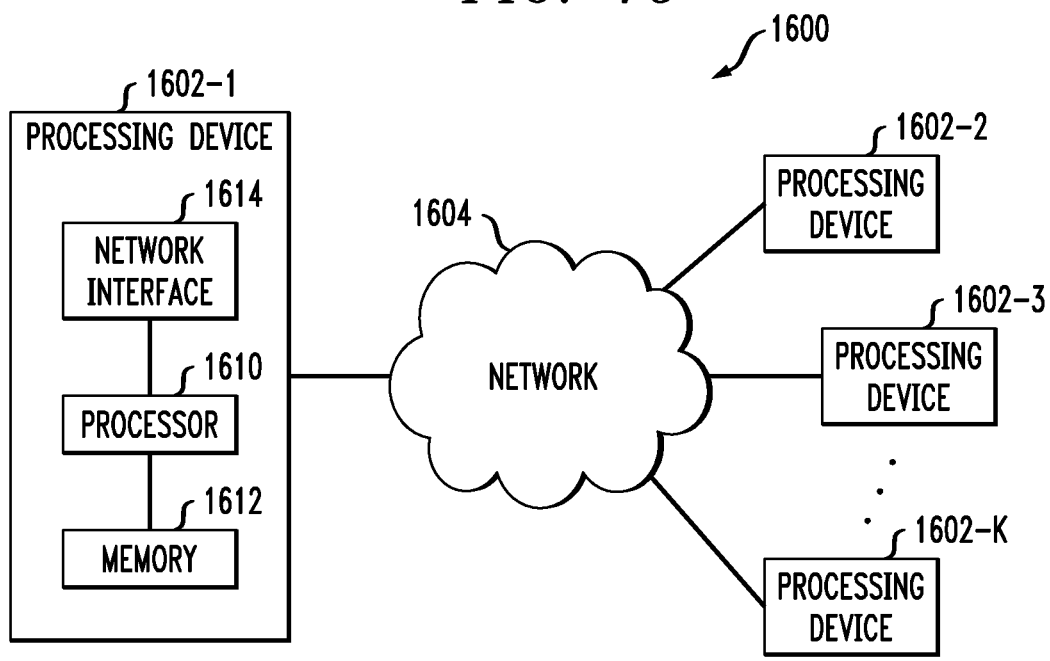

FIG. 15 shows an example processing platform comprising cloud infrastructure 1500. The cloud infrastructure 1500 comprises a combination of physical and virtual processing resources that are utilized to implement at least a portion of the information processing system 100. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 comprise respective VMs, respective sets of one or more containers, or respective sets of one or more containers running in VMs. In some implementations of the FIG. 15 embodiment, the VMs/container sets 1502 comprise respective VMs implemented using virtualization infrastructure 1504 that comprises at least one hypervisor.

A hypervisor platform may be used to implement a hypervisor within the virtualization infrastructure 1504, wherein the hypervisor platform has an associated virtual infrastructure management system. The underlying physical machines comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1602-1 in the processing platform 1600 comprises a processor 1610 coupled to a memory 1612.

The processor 1610 comprises a microprocessor, a microcontroller, an application-specific integrated circuit (ASIC), a field-programmable gate array (FPGA) or other type of processing circuitry, as well as portions or combinations of such circuitry elements.

The memory 1612 comprises random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining multiple items of input related to at least one storage component;
    determining a set of storage component sizing configurations by processing at least a portion of the multiple items of input using a first set of one or more machine learning techniques comprising at least one deep learning technique;
    identifying a subset of the storage component sizing configurations by processing at least a portion of the determined set of storage component sizing configurations using a second set of one or more machine learning techniques; and
    performing one or more automated actions based at least in part on the identified subset of storage component sizing configurations;
    wherein the method is performed by at least one processing device comprising a processor coupled to a memory.

2. The computer-implemented method of claim 1, wherein the at least one deep learning technique comprises at least one neural network.

3. The computer-implemented method of claim 1, wherein the at least one deep learning technique comprises at least one multilayer perceptron.

4. The computer-implemented method of claim 1, wherein the one or more machine learning techniques in the second set comprises at least one machine learning-based k-nearest neighbors algorithm.

5. The computer-implemented method of claim 1, further comprising:
    generating a dynamic workload performance library by applying at least one machine learning-based unsupervised clustering model to data pertaining to multiple storage components.

6. The computer-implemented method of claim 5, wherein the at least one machine learning-based unsupervised clustering model comprises at least one machine learning-based unsupervised clustering with Gaussian mixture model.

7. The computer-implemented method of claim 5, wherein the data pertaining to multiple storage components comprise configuration data and feature engineering data.

8. The computer-implemented method of claim 5, further comprising:
    updating the at least one deep learning technique using the generated dynamic workload performance library.

9. The computer-implemented method of claim 1, wherein the multiple items of inputs comprise information pertaining to two or more of input/output operations per second (IOPS), storage component capacity, at least one storage component workload, data reduction, deduplication, block size, drive type, and at least one redundant array of independent disks (RAID) group.

10. The computer-implemented method of claim 1, wherein obtaining the multiple items of input comprises querying a storage systems database for data and applying at least one statistical analysis technique to the queried data.

11. The computer-implemented method of claim 1, wherein performing the one or more automated actions comprises outputting the identified subset of storage component sizing configurations to a user for selection of at least one of the storage component sizing configurations from the subset.

12. A non-transitory processor-readable storage medium having stored therein program code of one or more software programs, wherein the program code when executed by at least one processing device causes the at least one processing device:
    to obtain multiple items of input related to at least one storage component;
    to determine a set of storage component sizing configurations by processing at least a portion of the multiple items of input using a first set of one or more machine learning techniques comprising at least one deep learning technique;
    to identify a subset of the storage component sizing configurations by processing at least a portion of the determined set of storage component sizing configurations using a second set of one or more machine learning techniques; and
    to perform one or more automated actions based at least in part on the identified subset of storage component sizing configurations.

13. The non-transitory processor-readable storage medium of claim 12, wherein the at least one deep learning technique comprises at least one neural network.

14. The non-transitory processor-readable storage medium of claim 12, wherein the at least one deep learning technique comprises at least one multilayer perceptron.

15. The non-transitory processor-readable storage medium of claim 12, wherein the one or more machine learning techniques in the second set comprises at least one machine learning-based k-nearest neighbors algorithm.

16. The non-transitory processor-readable storage medium of claim 12, wherein the program code when executed by the at least one processing device further causes the at least one processing device:
    to generate a dynamic workload performance library by applying at least one machine learning-based unsupervised clustering model to data pertaining to multiple storage components; and
    to update the one or more deep learning techniques using the generated dynamic workload performance library.

17. An apparatus comprising:
    at least one processing device comprising a processor coupled to a memory;
    the at least one processing device being configured:
        to obtain multiple items of input related to at least one storage component;
        to determine a set of storage component sizing configurations by processing at least a portion of the multiple items of input using a first set of one or more machine learning techniques comprising at least one deep learning technique;
        to identify a subset of the storage component sizing configurations by processing at least a portion of the determined set of storage component sizing configurations using a second set of one or more machine learning techniques; and to perform one or more automated actions based at least in part on the identified subset of storage component sizing configurations.

18. The apparatus of claim 17, wherein the at least one deep learning technique comprises at least one neural network.

19. The apparatus of claim 17, wherein the at least one deep learning technique comprises at least one multilayer perceptron.

20. The apparatus of claim 17, wherein the one or more machine learning techniques in the second set comprises at least one machine learning-based k-nearest neighbors algorithm.

* * * * *